US010873789B2

(12) United States Patent
Borawski et al.

(10) Patent No.: US 10,873,789 B2
(45) Date of Patent: *Dec. 22, 2020

(54) METHODS AND APPARATUS TO SYNTHESIZE REFERENCE MEDIA SIGNATURES (71) Applicant: The Nielsen Company (US), LLC, New York, NY (US)

(72) Inventors: Albert T. Borawski, Oldsmar, FL (US); Daniel Nelson, Tampa, FL (US); Vinay Chauhan, Sunnyvale, CA (US)

(73) Assignee: The Nielsen Company (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/741,353

(22) Filed: Jan. 13, 2020

(65) Prior Publication Data
US 2020/0228882 A1 Jul. 16, 2020

Related U.S. Application Data (63) Continuation of application No. 15/894,303, filed on Feb. 12, 2018, now Pat. No. 10,536,757.
(Continued)

(51) Int. Cl.
H04N 21/84 (2011.01)
H04N 21/658 (2011.01)
(Continued)

(52) U.S. Cl.
CPC .......... H04N 21/84 (2013.01); H04N 21/258 (2013.01); H04N 21/26603 (2013.01);
(Continued)

(58) Field of Classification Search
CPC ................ H04N 21/84; H04N 21/258; H04N 21/26603; H04N 21/44008;
(Continued)

(56) References Cited

U.S. PATENT DOCUMENTS 5,481,294 A 1/1996 Thomas et al.
8,923,688 B2 12/2014 Aggarwal et al.
(Continued)

OTHER PUBLICATIONS

European Patent Office, "Extended European Search Report," mailed in connection with European Patent Application No. 18189459.3, dated Oct. 22, 2018, 8 pages.
(Continued)

Primary Examiner — Cynthia M Fogg
(74) Attorney, Agent, or Firm — Hanley, Flight & Zimmerman, LLC (57) ABSTRACT Methods and apparatus to synthesize reference media signatures based on constituent media signatures generated by metered media devices are disclosed. An example apparatus includes a collector to collect first constituent media signatures from a first media device that identify a first portion of media, a collector to collect second constituent media signatures from a second media device that identify a second portion of the media, and a synthesizer to combine the first constituent media signatures from the first media device and the second constituent media signatures from the second media device to form a reference media signature that represents the media, the reference media signature for comparison with third constituent media signatures collected from a third media device to detect consumption of the media at the third media device.

20 Claims, 9 Drawing Sheets

Related U.S. Application Data (60) Provisional application No. 62/546,973, filed on Aug. 17, 2017.

(51) Int. Cl.
*H04N 21/442* (2011.01)
*H04N 21/845* (2011.01)
*H04N 21/258* (2011.01)
*H04N 21/266* (2011.01)
*H04N 21/8352* (2011.01)

(52) U.S. Cl.
CPC ... *H04N 21/44204* (2013.01); *H04N 21/6582* (2013.01); *H04N 21/8352* (2013.01); *H04N 21/8456* (2013.01)

(58) Field of Classification Search
CPC ............ H04N 21/4394; H04L 63/1416; H04L 9/3247; A61B 17/3496; A61B 17/3401; A61B 17/3403; A61B 2017/3413; A61M 25/0108; A61M 19/00
USPC .......................................................... 725/19
See application file for complete search history.

(56) References Cited

U.S. PATENT DOCUMENTS

| | | |
|---|---|---|
| 2009/0049465 A1 | 2/2009 | Deng |
| 2009/0106297 A1 | 4/2009 | Wright et al. |
| 2011/0013887 A1* | 1/2011 | Demas ............... H04N 21/6587 386/343 |
| 2011/0063317 A1* | 3/2011 | Gharaat ................. G06Q 30/04 345/545 |
| 2013/0290502 A1* | 10/2013 | Bilobrov ................. G06F 21/10 709/223 |
| 2014/0282693 A1 | 9/2014 | Soundararajan et al. |
| 2015/0163545 A1 | 6/2015 | Freed et al. |
| 2015/0256905 A1 | 9/2015 | Lee et al. |
| 2015/0289013 A1 | 10/2015 | Nelson et al. |
| 2015/0319490 A1 | 11/2015 | Besehanic |
| 2015/0363420 A1 | 12/2015 | Garland et al. |
| 2017/0180798 A1 | 6/2017 | Goli et al. |
| 2019/0058926 A1 | 2/2019 | Borawski et al. |

OTHER PUBLICATIONS

United States Patent and Trademark Office, "Notice of Allowance," mailed in connection with U.S. Appl. No. 15/894,303, dated Sep. 5, 2019, 9 pages.

United States Patent and Trademark Office, "Final Office Action," mailed in connection with U.S. Appl. No. 15/894,303, dated May 3, 2019, 24 pages.

United States Patent and Trademark Office, "Non-final Office Action," mailed in connection with U.S. Appl. No. 15/894,303, dated Aug. 28, 2018, 29 pages.

European Patent Office, "Communication Pursuant to Article 94(3) EPC," mailed in connection with European Patent Application No. 18189459.3, dated Mar. 19, 2020, 4 pages.

China National Intellectual Property Administration, "First Office Action," issued in connection with Chinese Patent Application No. 201810940621.6, dated Jul. 29, 2020, received Aug. 26, 2020, 20 pages.

* cited by examiner

METHODS AND APPARATUS TO SYNTHESIZE REFERENCE MEDIA SIGNATURES

RELATED APPLICATION

This patent arises from a continuation of U.S. patent application Ser. No. 15/894,303 (now U.S. Pat. No. 10,536,757) which is entitled "METHODS AND APPARATUS TO SYNTHESIZE REFERENCE MEDIA SIGNATURES," and which was filed on Feb. 12, 2018, which claims the benefit of U.S. Provisional Patent Application Ser. No. 62/546,973, which was filed on Aug. 17, 2017. Priority to U.S. patent application Ser. No. 15/894,303 and U.S. Provisional Patent Application Ser. No. 62/546,973 is claimed. U.S. patent application Ser. No. 15/894,303 and U.S. Provisional Patent Application Ser. No. 62/546,973 are hereby incorporated herein by reference in their respective entireties.

FIELD OF THE DISCLOSURE

This disclosure relates generally to monitoring media using media signatures and, more particularly, to methods and apparatus to synthesize reference media signatures based on constituent media signatures generated by metered media devices.

BACKGROUND

In recent years, methods of accessing media have evolved. For example, in the past, media was primarily accessed via televisions coupled to set-top boxes. Recently, media services deployed via Over-The-Top (OTT) devices or internet streaming capable devices, such as an Amazon Kindle Fire™, an Apple TV®, a Roku® media player, etc., have been introduced that allow users to request and present media on the OTT devices. Such OTT devices, as well as other media presentation platforms, such as desktop, laptop, and handheld mobile devices (e.g., smartphones, tablets, etc.) enable consumption of media from a variety of content providers and content publishers.

The figures are not to scale. In general, the same reference numbers will be used throughout the drawing(s) and accompanying written description to refer to the same or like parts. Connecting lines and/or connectors shown in the figures are intended to represent example functional relationships and/or or physical or logical couplings between the various elements.

DETAILED DESCRIPTION

Many entities have an interest in understanding how users are exposed to media on the Internet. For example, an audience measurement entity (AME) desires knowledge of how users interact with media devices, such as smartphones, tablets, laptops, smart televisions, etc., and/or media presented thereon. For example, an AME may want to monitor media presentations made at the media devices to, among other things, monitor exposure to advertisements, determine advertisement effectiveness, determine user behavior, identify purchasing behavior associated with various demographics, etc.

AMEs coordinate with advertisers to obtain knowledge regarding an audience of media. For example, advertisers are interested in knowing the composition, engagement, size, etc., of an audience for media. For example, media (e.g., audio and/or video media) may be distributed by a media distributor to media consumers. Content distributors, advertisers, content producers, etc. have an interest in knowing the size of an audience for media by the media distributor, the extent to which an audience consumes the media, whether the audience pauses, rewinds, fast-forwards the media, etc. In some examples, the term "content" includes programs, advertisements, clips, shows, etc., In some examples, the term "media" includes any type of audio and/or visual content and/or advertisement delivered via any type of distribution medium. Thus, media includes television programming and/or advertisements, radio programming and/or advertisements, movies, web sites, streaming media, etc. Unless context clearly dictates otherwise, for ease of explanation, "media" refers to a piece of media (e.g., movie, TV show, etc.) in its entirety.

In some instances, AMEs identify media by extracting media identifiers such as fingerprints, signatures, and/or media-identifying metadata, such as codes, watermarks, etc., and comparing them to reference media identifiers. For example, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A reference media signature may be a series of constituent media signatures collected in series over a time interval. A good signature is repeatable when processing the same media presentation, but is unique relative to other (e.g., different) presentations of other (e.g., different) media. Accordingly, the terms "fingerprint" and "signature" are used interchangeably herein and are defined herein to mean any proxy for identifying media that is generated from one or more inherent characteristics of the media.

Signature-based media monitoring generally involves determining (e.g., generating or otherwise collecting) signature(s) representative of a media signal (e.g., an audio signal and/or a video signal) output by a monitored media device and comparing the collected signature(s) to one or more references signatures corresponding to known (e.g., reference) media sources. Various comparison criteria, such as a cross-correlation value, a Hamming distance, etc., can be evaluated to determine whether a collected signature matches a particular reference media signature. When a match between the collected signature and one of the reference media signatures is found, the monitored media can be identified as corresponding to the particular reference media represented by the reference media signature that matched the collected signature. Because attributes, such as an identifier of the media, a presentation time, a broadcast channel, etc., associated with the reference media signature are collected, these attributes may then be associated with the monitored media whose collected signature matched the reference media signature. Example systems for identifying media based on codes and/or signatures are long known and were first disclosed in Thomas, U.S. Pat. No. 5,481,294, which is hereby incorporated by reference in its entirety.

Example methods, apparatus, and articles of manufacture disclosed herein monitor media presentations at media devices. Such media devices may include, for example, Internet-enabled televisions, personal computers (e.g., desktop computers, laptop computers, etc.), Internet-enabled mobile handsets (e.g., a smartphone), video game consoles (e.g., Xbox®, PlayStation®), tablet computers (e.g., an iPad®), digital media players (e.g., an Apple TV®, an Amazon Kindle Fire™, a Roku® media player, a Slingbox®, etc.), etc.

In examples disclosed herein, a media device asset manager (MDAM) obtains a media device asset including one or more constituent media signatures from a metered media device and one or more corresponding media identifiers (e.g., metadata). As used herein, the term "media device asset" refers to any type of information extracted from media presented at a media device, such as, one or more signatures and/or other media-identifying metadata, such as one or more codes, one or more watermarks, etc. As used herein, the term "media identifier" refers to any type of media identification information, such as a source identifier, a stream identifier, a passive audio signature (PAS) timestamp, a duration of media, etc., and/or a combination thereof.

In some disclosed examples, the MDAM obtains from a device other than a media device (e.g., a metering device) a media asset including one or more signatures and one or more corresponding media identifiers. In some examples, the term "media asset" refers to any type of information extracted from media such as one or more signatures and/or other media-identifying metadata, such as one or more codes, one or more watermarks, etc.

In some disclosed examples, a media device asset is a collection of two or more signatures from a media device that individually and/or collectively identify media from which the signatures were obtained. For example, the media device asset may be a sequence of two or more signatures obtained from a meter operating on an Over-The-Top (OTT) device monitoring a presentation of the Home Box Office (HBO) content "Game of Thrones" on the OTT device. In another example, the meter may be operating externally to the OTT device. In such an example, the media device asset may be a sequence of two or more signatures obtained from a media meter, a people meter, etc., monitoring a presentation of the media.

In some disclosed examples, media is presented at a media device and a meter monitoring the media device uses signature-generation software to generate media device assets based on the presented media. In such disclosed examples, the media device asset may include unidentifiable data or unmatchable data (e.g., unidentifiable signatures, etc.) due to environmental elements such as audible noise emanating from the media device (e.g., a noise from a message alert on a smartphone, a noise from an email alert on a tablet, etc.). In some disclosed examples, a qualification process can be applied to the unidentifiable signatures to determine whether they can be stored in a reference media signature database. In some disclosed examples, the meter operates on the media device (e.g., a signature-generation application executing machine-readable instructions on a laptop, etc.). In other disclosed examples, the meter operates externally to the media device (e.g., a standalone metering device, etc.).

In some disclosed examples, the MDAM determines that a media device asset obtained from a media device has already been stored in a database (e.g., a media device asset database, etc.). For example, the MDAM may identify the media device asset as a duplicate syndicated media device asset. In such an example, the MDAM may (1) identify the media device asset based on an extracted media identifier, (2) determine that the media device asset has previously been stored in the database, and (3) determine that the previously stored media device asset is not a proprietary media asset. In such an example, the MDAM may store a log indicating that the media device asset is a duplicate syndicated media device asset. Additionally, and/or alternatively, the example MDAM may increment a duplicate syndicated media device asset counter corresponding to a number of times the media device asset is obtained and/or determined to be a duplicate syndicated media device asset. In some examples, after storing the log and/or incrementing the duplicate syndicated media device asset counter, the MDAM may discard the media device asset.

In some disclosed examples, the MDAM identifies a media device asset obtained from a media device as a syndicated duplicate of a proprietary media asset. In such an example, the MDAM may (1) identify the media device asset based on an extracted media identifier, (2) determine that the media device asset has previously been stored in the database, and (3) determine that the previously stored media device asset is a proprietary media asset. In such an example, the MDAM may store a log corresponding to determining that the media device asset is a syndicated duplicate of a proprietary media asset. Additionally, and/or alternatively, the example MDAM may replace the previously stored proprietary media asset with the media device asset.

In some disclosed examples, the MDAM determines that a media device asset obtained from a media device has not been previously stored in a database (e.g., a media device asset database, etc.). In such disclosed examples, the MDAM identifies the media device asset as a database candidate. For example, a database candidate may correspond to media where there are no reference media signatures stored in the database. As a result, a qualification process can be applied to one or more database candidates to determine a best one of the one or more database candidates to be stored in the database as a reference media signature, a reference media device asset, etc.

Figure 1:
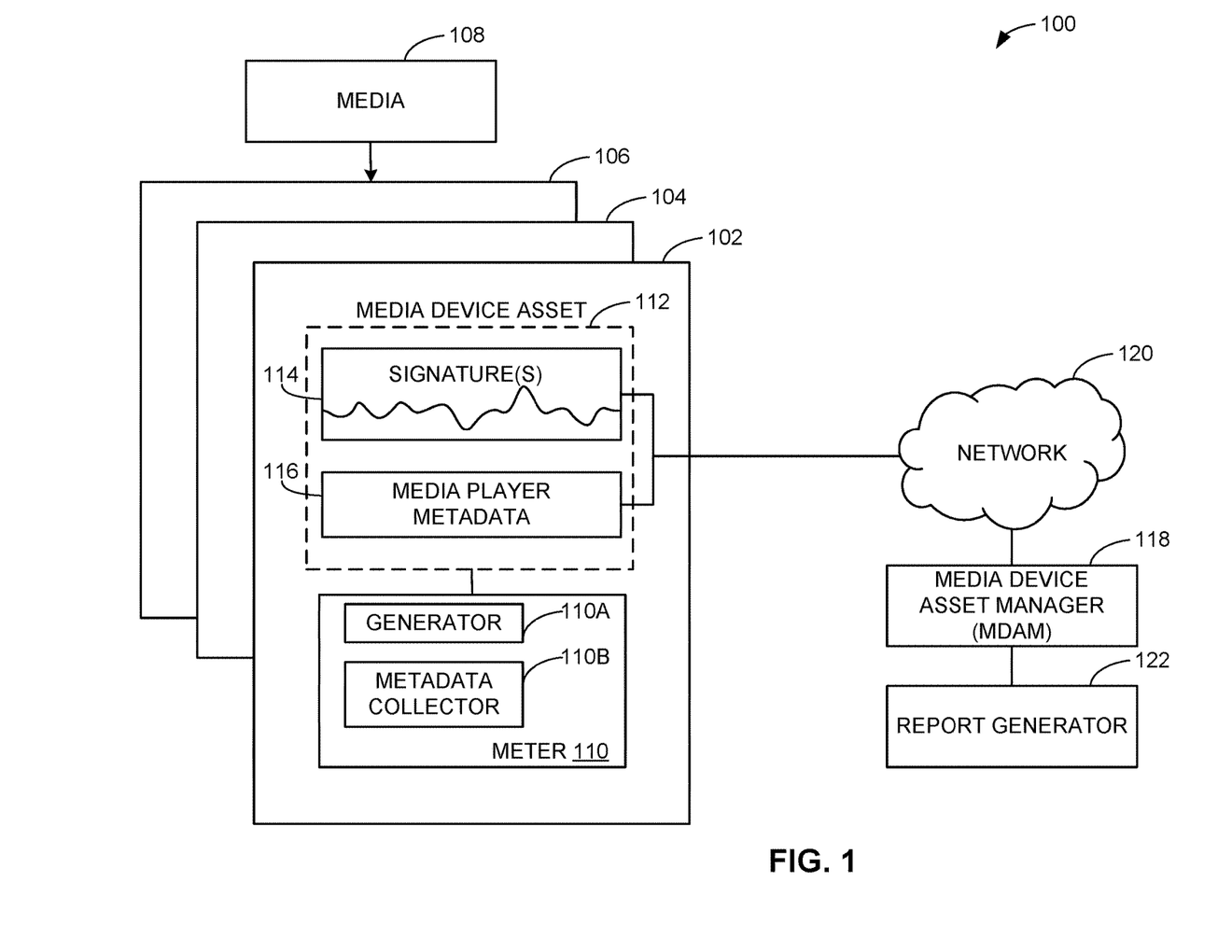
FIG. 1 is a block diagram of an example environment in which an example media device asset manager, according to teachings of this disclosure, synthesizes reference media signatures based on constituent media signatures generated by metered media devices.

FIG. 1 is a block diagram of an example environment 100 constructed in accordance with teachings of this disclosure to synthesize reference media signatures based on constituent media signatures collected (e.g., generated, formed, computed, created, etc.) by metered media devices, three of which are designated at reference numerals 102, 104 and 106. In the illustrated example of FIG. 1, the metered media devices 102, 104, 106 are devices that obtain (e.g., receive) media 108 and present the media 108. In the illustrated example, the media 108 is a video that includes audio. However, any other type of media may be processed by examples disclosed herein. In some examples, the metered media devices 102, 104, 106 are capable of directly presenting media (e.g., via a display) while, in some other examples, the media devices 102, 104, 106 present the media on separate media presentation equipment (e.g., speakers, a display, etc.). For example, the metered media device 102 of the illustrated example is an Internet-enabled television capable of presenting media (e.g., via an integrated display and speakers, etc.) streaming from an OTT device. However, the metered media device 102 may be any other type of media device. Further, while in the illustrated example three media devices 102, 104, 106 are shown, any number and/or type(s) of media devices may be used.

In the illustrated example of FIG. 1, each of the metered media devices 102, 104, 106 includes a respective meter 110. In the illustrated example, the meters 110 are a software applications operating on the respective media device(s) 102, 104, 106 and including computer-readable instructions executable to generate media device assets. Additionally, and/or alternatively, one or more of the meter(s) 110 may operate externally to the respective media device 102, 104, 106 (e.g., a standalone device including a processor executing machine-readable instructions, etc.). In the illustrated example, the meters 110 generate media device assets 112 based on the media 108. In the illustrated example, the media device assets 112 generated by a given meter 110 include signatures 114 computed or generated by an example generator 110A of the meter 110 from audio output and/or to be output by the media device 102, 104, 106, and one or more media player metadata 116 collected by an example metadata collector 110B of the meter 110, which may be implemented as a software meter monitoring a media player and/or other application (e.g., a web browser) capable of presenting media 108. In the illustrated example, the signatures 114 include one or more audio-based signatures. Additionally, and/or alternatively, the signatures 114 may include one or more video-based signatures and/or any other type of signatures based on media identification information (e.g., media-identifying metadata, etc.). In the illustrated example, the media player metadata 116 includes media-identifying metadata corresponding to the media 108, as well as metadata describing operation of the media player used to play the media 108.

In the illustrated example of FIG. 1, the example meters 110 transmit their respective media device assets 112 to an example MDAM 118 via an example network 120. In the illustrated example of FIG. 1, the network 120 is the Internet. However, the example network 120 may be implemented using any suitable wired and/or wireless network(s) including, for example, one or more data buses, one or more local area networks (LANs), one or more wireless LANs (WLANs), one or more cellular networks, one or more coaxial cable networks, one or more satellite networks, one or more private networks, one or more public networks, etc. The example network 120 enables the metered media devices 102, 104, 106, the meters 110, etc. to be in communication with the MDAM 118. As used herein, the phrase "in communication," including variances (e.g., secure or non-secure communications, compressed or non-compressed communications, etc.) thereof, encompasses direct communication and/or indirect communication through one or more intermediary components and does not require direct physical (e.g., wired) communication and/or constant communication, but rather includes selective communication at periodic or aperiodic intervals, as well as one-time events.

Figure 2:
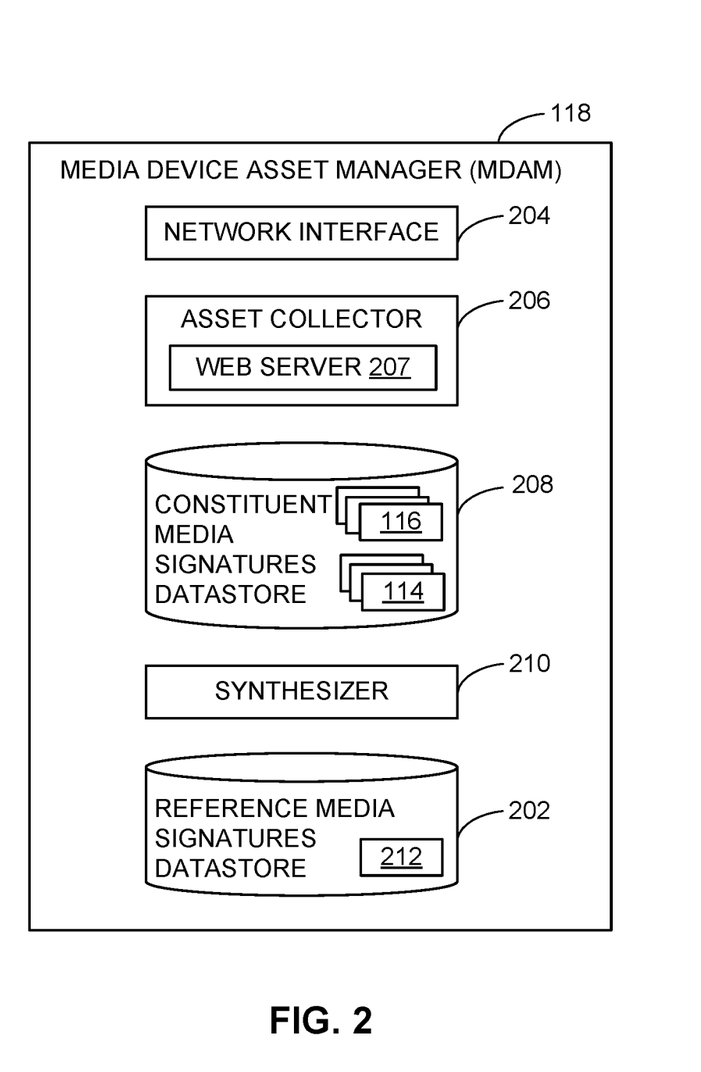
FIG. 2 is a block diagram of an example implementation of the example media device asset manager of FIG. 1 according to teachings of this disclosure.

In the illustrated example of FIG. 1, the MDAM 118 coordinates an identification, a selection, etc., of a media device asset (e.g., a sequence of constituent media signatures 114) to be stored in a database (e.g., an example datastore 202 in FIG. 2). The MDAM 118 may use constituent media signatures 114 of a media device asset 112 to synthesize a reference media signature 212.

In the illustrated example of FIG. 1, an example report generator 122 generates and/or prepares reports using information stored in the media device asset database. In the illustrated example, the report generator 122 prepares media measurement reports indicative of the exposure of the media 108 on the media devices 102, 104, 106. In some examples, the report generator 122 generates a report identifying demographics associated with the media 108 based on identifying one or more media device assets including the media device assets 112. For example, a panelist at a media exposure measurement location may have provided the panelist's demographics to an AME. The report generator 122 may prepare a report associating the obtained panelist demographics with the media 108.

FIG. 2 is a block diagram of an example implementation of the example MDAM 118 of FIG. 1 according to teachings of this disclosure. The example MDAM 118 of FIG. 2 manages a constituent media signatures datastore 202, based on identifying media device assets (e.g., generated constituent media signatures 114, collected media player metadata 116, etc.) obtained (e.g., collected, received, etc.) from media devices (e.g., the example media devices 102, 104, and 106 of FIG. 1) for use in subsequent measuring and/or monitoring by an AME. In the illustrated example of FIG. 2, the example MDAM 118 includes an example network interface 204, an example asset collector 206, an example constituent media signatures datastore 208, an example synthesizer 210, and the example constituent media signatures datastore 202.

In the illustrated example of FIG. 2, the MDAM 118 includes the example network interface 204 and the example asset collector 206 to obtain information from and/or transmit information to the network 120 of FIG. 1. In some examples, the example asset collector 206 implements a web server 207 that receives the media device assets 112 from the media device 102 and/or the meter 110. In some such examples, the information included in the media device asset 112 is formatted as an HTTP message. However, any other message format and/or protocol may additionally, and/or alternatively, be used, such as, for example, a file transfer protocol (FTP), a simple message transfer protocol (SMTP), an HTTP secure (HTTPS) protocol, etc. In some examples, the asset collector 206 determines whether to continue monitoring a media device 102, 104, 106. For example, the asset collector 206 may determine that one or more of the metered media devices 102, 104, 106 of FIG. 1 are not presenting the media 108 of FIG. 1, are not powered on, etc. In the example of FIG. 2, the media device assets 112 (e.g., as constituent media signatures 114 and media player metadata 116) are stored in the example constituent media signatures datastore 208.

To generate reference media signatures 114 that can be used to perform audience measurement, the example MDAM 118 includes the example synthesizer 210. The example synthesizer 210 of FIG. 2 combines constituent media signatures 114 generated (e.g., computed, formed, etc.) by one or more of the example generators 110A of the one or more example meters 110 with media player metadata 116 collected by one or more of the collectors 110B of one or more of the example meters 110 to form reference media signatures 212. The constituent media signatures 114 and the media player metadata 116 are collected in the constituent media signatures datastore 208 by the example asset collector 206.

To synthesize reference media signatures 212 using the constituent media signatures 114 being collected by metered media devices (e.g., by the example meters 110 of the media devices 102, 104, 106), the example MDAM 118 includes the example synthesizer 210. The example synthesizer 210 of FIG. 2 processes the constituent media signatures 114 and the media player metadata 116 through a process of considering constituent media signatures 114, qualifying them, and then creating reference media signatures 212 from the qualified constituent media signatures 114. In some examples, a reference media signature 212 represents a complete piece of media 108 from its start to its end.

In some examples, the synthesizer 210 of FIG. 2 uses the media player metadata 116 to qualify constituent media signatures 114 by associating the constituent media signatures 114 with specific portions of the media 108 so they can then be combined to represent larger segments and/or all of a complete piece of the media 108. The example synthesizer 210 of FIG. 2 combines constituent media signatures 114 to synthesize (e.g., form, generate, create, etc.) a set of reference media signatures 212 (a.k.a. a reference asset), which in some examples, is a complete sequence of media signatures from start to end of the media 108, and its corresponding metadata (e.g., title, description, duration, episode, season, artist, owner, provider, etc.), which can be used by a crediting system to identify monitored media content by matching meter signatures (e.g., audio signatures) with reference media signatures 212.

As media 108 is presented there may be usage behavior(s), such as fast-forward event, a rewind event, a pause event, a skip event, a stop/resume later event, etc., and/or browser/player behavior (e.g., buffering, etc.) that cause incomplete, duplicate, overlapping, irregular, non-contiguous, etc. constituent media signatures 114. In some examples, the constituent media signatures 114 are harvested and presented to the qualification process as viable constituent media signatures 114. Because, the metadata collector 110B can obtain and provide media player metadata 116 (e.g., such as position within content, pause, fast-forward, etc.), the synthesizer 210 can associate constituent media signatures 114 with locations within the media, rendering the constituent media signatures 114 viable, and useable to synthesize a reference media signature 212.

While an example manner of implementing the MDAM 118 of FIG. 1 is illustrated in FIG. 2, one or more of the elements, processes and/or devices illustrated in FIG. 2 may be combined, divided, re-arranged, omitted, eliminated and/or implemented in any other way. Further, the example constituent media signatures datastore 202, the example network interface 204, the example asset collector 206, the example reference media signatures datastore 208, the example synthesizer 210 and/or, more generally the example MDAM 118 of FIG. 2 may be implemented by hardware, software, firmware and/or any combination of hardware, software and/or firmware. Thus, for example, any of the example constituent media signatures datastore 202, the example network interface 204, the example asset collector 206, the example reference media signatures datastore 208, the example synthesizer 210 and/or, more generally the example MDAM 118 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example constituent media signatures datastore 202, the example network interface 204, the example asset collector 206, the example reference media signatures datastore 208, the example synthesizer 210 and/or, more generally the example MDAM 118 is/are hereby expressly defined to include a non-transitory machine-readable storage device or storage disk such as a memory, a digital versatile disk (DVD), a compact disc (CD), a Blu-ray disk, etc. including the software and/or firmware. Further still, the example MDAM 118 of FIG. 1 may include one or more elements, processes and/or devices in addition to, or instead of, those illustrated in FIG. 2, and/or may include more than one of any or all the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
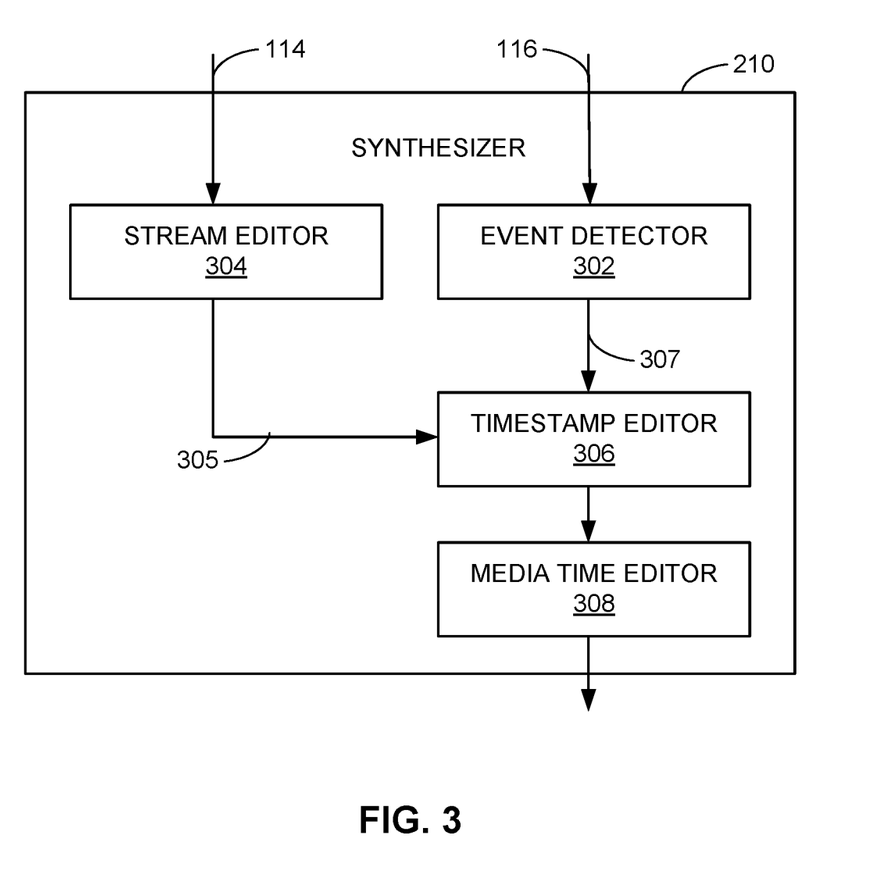
FIG. 3 is a block diagram of an example implementation of the example synthesizer of FIG. 2 according to teachings of this disclosure.

FIG. 3 is a block diagram of an example implementation of the example synthesizer 210 of FIG. 2. To detect usage and/or browser, player, etc. events 307 (e.g., a pause, a rewind, a fast-forward, a skip, etc.) that may cause discrepancies between the media 108 being presented (e.g., watched, listened to, etc.) and the collected constituent media signatures 114, the example synthesizer 210 includes an example event detector 302. In some examples, the example event detector 302 of FIG. 3 detects events using any known and/or future methods, circuits, software, etc. including, but not limited to, an infrared receiver, a software utility logging use of a computer, etc. In some examples, events are detected at the MDAM 118.

To modify a stream of constituent media signatures 114, the example synthesizer 210 of FIG. 3 includes an example stream editor 304. The example stream editor 304 of FIG. 3 maintains a stream 305 (e.g., collection) of constituent media signatures 114 that is being assembled to form a candidate set of reference media signature(s) 212 representing all of a piece of media 108. The stream editor 304 can, among other things, add, remove and replace constituent media signatures 114 to and/or from the stream 305.

To modify timestamps, the example synthesizer 210 of FIG. 3 includes an example timestamp editor 306. The example timestamp editor 306 of FIG. 3 edits the timestamps of assembled constituent media signatures 114 of the stream 305 so their timestamps are contiguous to account, compensate, etc. for any events 307 detected by the event detector 302.

To modify media times, the example synthesizer 210 of FIG. 3 includes an example media time editor 308. The example media time editor 308 of FIG. 3 edits media times so they are contiguous and/or consistent with media signature timestamps.

While an example manner of implementing the synthesizer 210 of FIG. 2 is illustrated in FIG. 3, one or more of the elements, processes and/or devices illustrated in FIG. 3 may be combined, divided, re-arranged, omitted, eliminated and/or implemented in any other way. Further, the example event detector 302, the example stream editor 304, the example timestamp editor 306, the example media time editor 308 and/or, more generally the example synthesizer 210 of FIG. 3 may be implemented by hardware, software, firmware and/or any combination of hardware, software and/or firmware. Thus, for example, any of the example event detector 302, the example stream editor 304, the example timestamp editor 306, the example media time editor 308 and/or, more generally the example synthesizer 210 could be implemented by one or more analog or digital circuit(s), logic circuits, programmable processor(s), programmable controller(s), GPU(s), DSP(s), ASIC(s), PLD(s) and/or FPLD(s). When reading any of the apparatus or system claims of this patent to cover a purely software and/or firmware implementation, at least one of the example event detector 302, the example stream editor 304, the example timestamp editor 306, the example media time editor 308 and/or, more generally the example synthesizer 210 is/are hereby expressly defined to include a non-transitory machine-readable storage device or storage disk such as a memory, a DVD, a CD, a Blu-ray disk, etc. including the software and/or firmware. Further still, the example synthesizer 210 of FIG. 3 may include one or more elements, processes and/or devices in addition to, or instead of, those illustrated in FIG. 3, and/or may include more than one of any or all the illustrated elements, processes and devices.

Figure 4A:
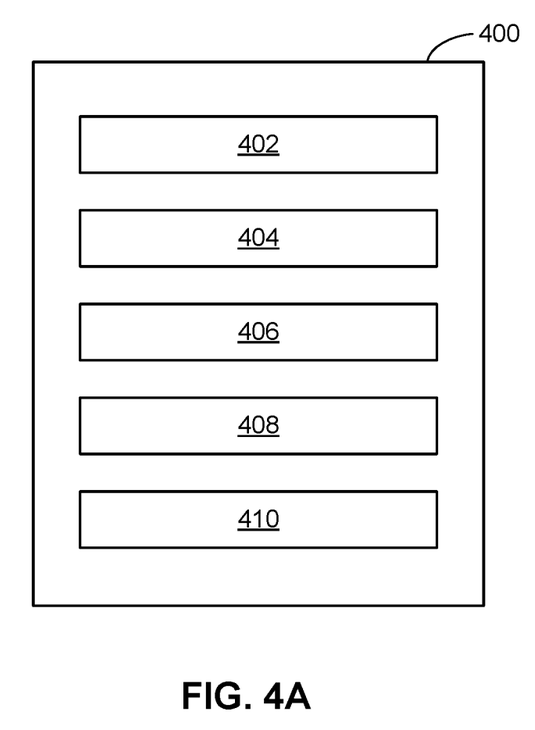
FIGS. 4A, 4B, 4C, 4D, 4E and 4F are flowcharts representing hardware logic or machine-readable instructions for implementing the example synthesizer of FIGS. 2 and 3 to synthesize reference media signatures based on constituent media signatures generated by metered media devices.

FIG. 4A is a block diagram representative of example hardware logic and/or machine-readable instructions 400 including machine-readable instructions 402, 404, 406, 408 and 410 for implementing the synthesizer 210 of FIG. 3. FIGS. 4B, 4C, 4D, 4E and 4F are flowcharts representative of the example hardware logic and/or machine-readable instructions 402, 404, 406, 408 and 410, respectively, of FIG. 4A. The machine-readable instructions may be a program(s) or portion of a program(s) for execution by a processor such as the processor 510 shown in the example processor platform 500 discussed below in connection with FIG. 5. The program(s) and/or portions thereof may be embodied in software stored on a non-transitory machine-readable storage medium such as a CD, a floppy disk, a hard drive, a DVD, a Blu-ray disk, or a memory associated with the processor 510, but the entire program and/or parts thereof could alternatively be executed by a device other than the processor 510 and/or embodied in firmware or dedicated hardware. Further, although the example program is described with reference to the flowcharts illustrated in FIGS. 4A-4F, many other methods of implementing the example synthesizer 210 may alternatively be used. For example, the order of execution of the blocks may be changed, and/or some of the blocks described may be changed, eliminated, or combined. Additionally, and/or alternatively, any or all the blocks may be implemented by one or more hardware circuits (e.g., discrete and/or integrated analog and/or digital circuitry, an FPGA, a DSP, a GPU, a PLD, a FPLD, an ASIC, a comparator, an operational-amplifier (op-amp), a logic circuit, etc.) structured to perform the corresponding operation without executing software or firmware.

As mentioned above, the example processes of FIGS. 4A-4F may be implemented using executable instructions (e.g., computer and/or machine-readable instructions) stored on a non-transitory computer and/or machine-readable medium such as a hard disk drive, a flash memory, a read-only memory, a CD-ROM, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer-readable medium is expressly defined to include any type of computer-readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

Figure 4B:
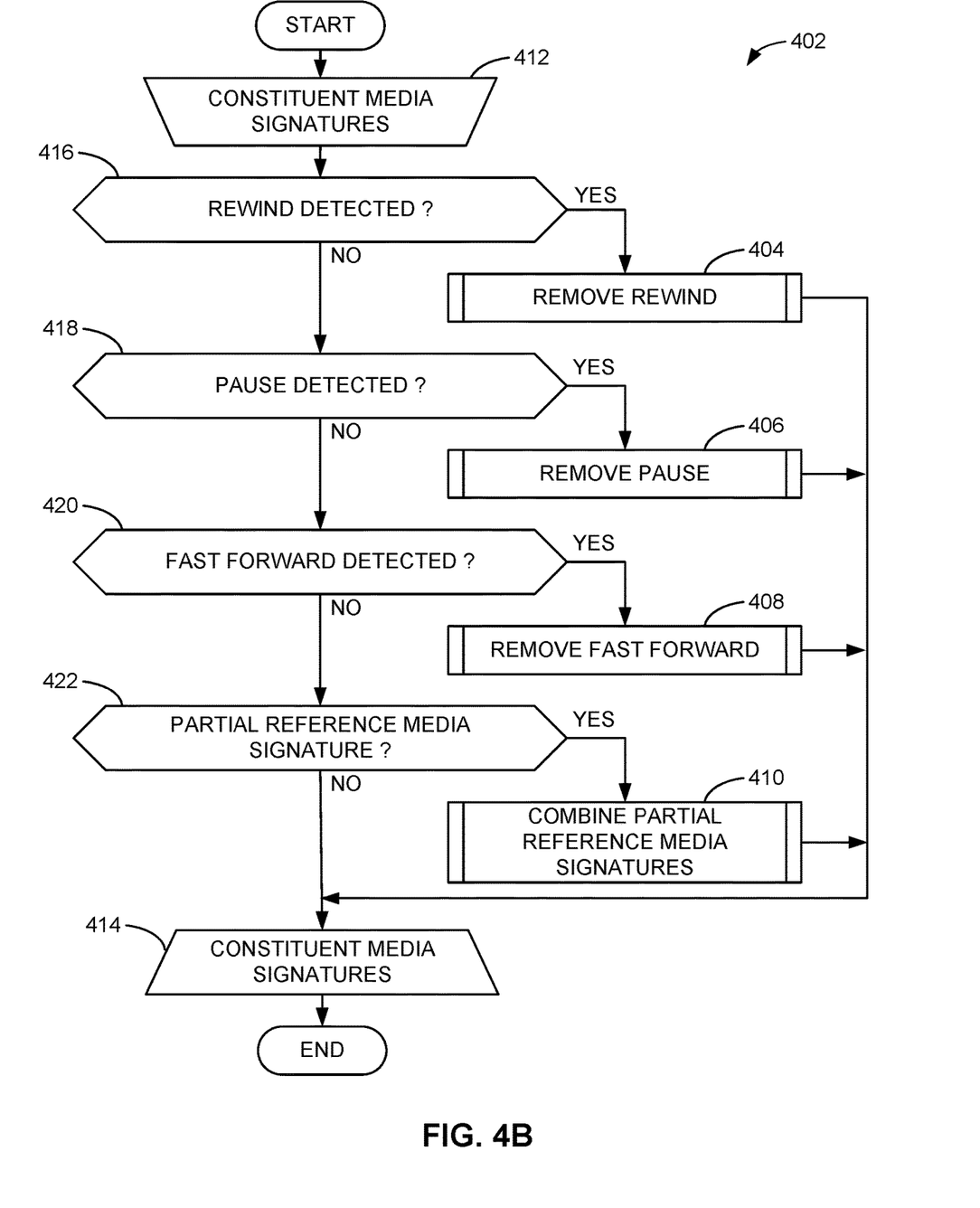

The example program 400 of FIG. 4A begins with the example program 402 of FIG. 4B. The example program 402 of FIG. 4B processes the constituent media signatures 114 (between blocks 412 and 414) collected from the meters 110 by the example asset collector 206 for a piece of media 108 to form a candidate set of reference media signature(s) 212. In some examples, a constituent media signature 114 represents a portion of a piece of media 108, and a set of reference media signature(s) 212 is an ordered collection of constituent media signatures 114 that collectively represent the piece of media 108. If the example event detector 302 of FIG. 3 detects a rewind event (block 416), the synthesizer 210 removes (e.g., discards, deletes, etc.) the constituent media signatures 114 associated with the rewind event (example program 404, see FIG. 4C). For example, the event detector 302 can determine a rewind event occurred by detecting the media time of a seek event (e.g., start, play, slow-play, etc.) (e.g., 12:31 minutes) is less than the media time associated with a pause event (e.g., 15:03 minutes). In some examples, the pause/stop and rewind events are reflected in the media player metadata 116. In some examples, media time represents the location in media 108 expressed in time.

Figure 4C:
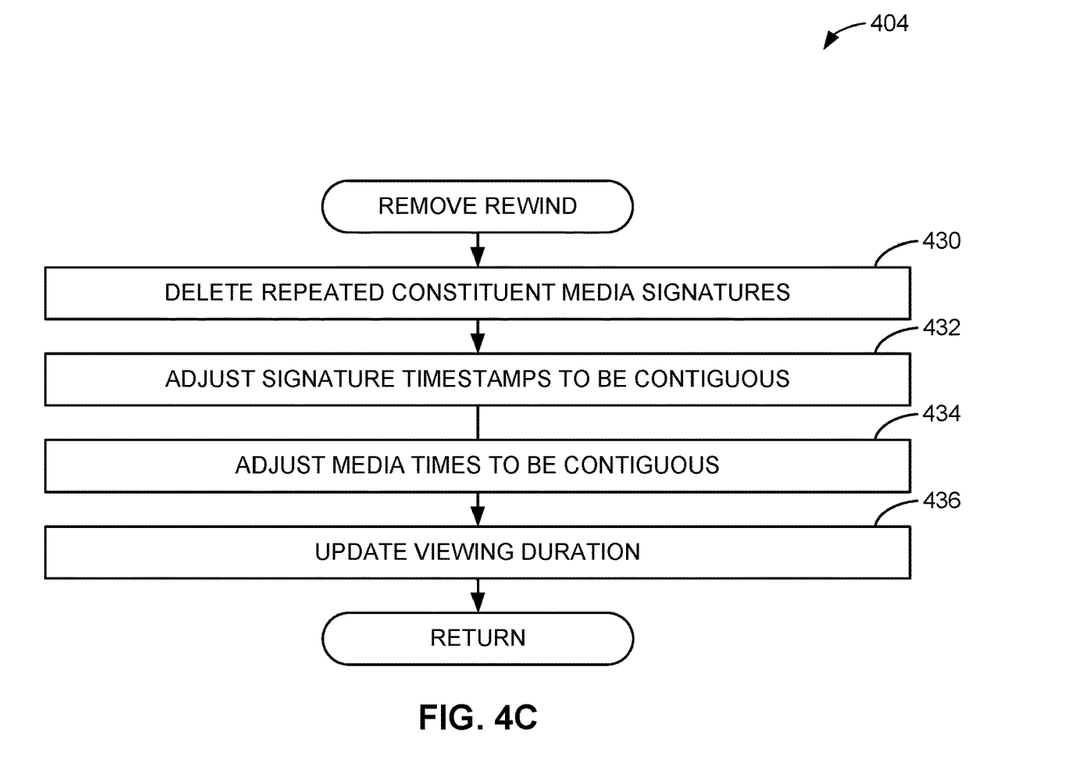

The example program 404 of FIG. 4C begins with the example stream editor 304 of FIG. 3 identifying and removing the constituent media signatures 114 associated with an extra (e.g., rewound) play of a section of media 108 from the set of reference media signature(s) 212 being formed to represent the media 108 (block 430). For example, a duplicate set of constituent media signatures 114 associated with the media between 12:31 minutes and 15:03 minutes of the media 108 that was generated at a subsequent time the media 108 was played is ignored or discarded. Alternatively, prior constituent media signatures 114 are discarded. In some examples, the redundant, extra, etc. constituent media signatures 114 are also removed from the datastore 208. The example timestamp editor 306 of FIG. 3 changes the timestamps of the constituent media signatures 114 in the set of reference media signature(s) 212 so the timestamps assigned to the constituent media signatures 114 are contiguous from before, through and after the rewind event (block 432). The media time editor 308 adjusts media times, if needed, so media times are also contiguous and consistent with the timestamps (block 434). By discarding the redundant (although possibly not identical) constituent media signatures 114 associated with the replay, and adjusting the signature timestamps and media times (e.g., the position in the media 108 expressed in second, minutes, etc.) to be contiguous, the reference media signature sequence 212 being created is as if the rewind event never occurred. In some examples, viewing duration is updated to include the replay event (block 436). Control returns from the example program 404 of FIG. 4C to block 414 of FIG. 4B.

Figure 4D:
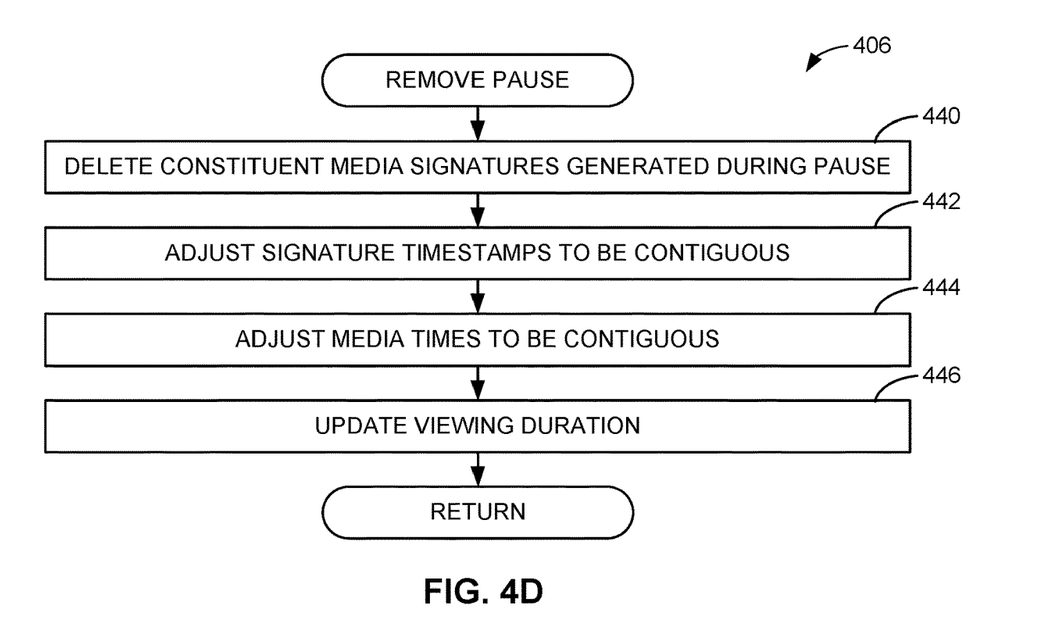

If the example event detector 302 of FIG. 3 detects a pause or stop event (block 418), the synthesizer 210 removes the pause event (example program 406, see FIG. 4D). For example, the event detector 302 can determine a pause event occurred by detecting use of a pause control aspect of a media device 102, 104, 106. The example program 406 of FIG. 4D begins with the example stream editor 304 ignoring the constituent media signatures 114 that are inapplicable to the media 108 because they were generated during the pause event, e.g., while a pause control is active (e.g., as captured in the media player metadata 116) (block 440). The example timestamp editor 306 of FIG. 3 changes the timestamps of the constituent media signatures 114 in the set of reference media signature(s) 212 being formed to represent the media 108 so the timestamps assigned to the constituent media signatures 114 are contiguous from before, through and after the pause event (block 442). The example media time editor 308 of FIG. 3 adjusts media times, if needed, so media times are also contiguous and consistent with the timestamps (block 444). By discarding the inapplicable constituent media signatures 114 associated with the pause, and adjusting the signature timestamps and media times to be contiguous, the reference media signature sequence 212 being created is as if the pause event never occurred. In some examples, viewing duration is updated to include the pause event (block 446). Control returns from the example program 406 of FIG. 4D to block 414 of FIG. 4B.

Figure 4E:
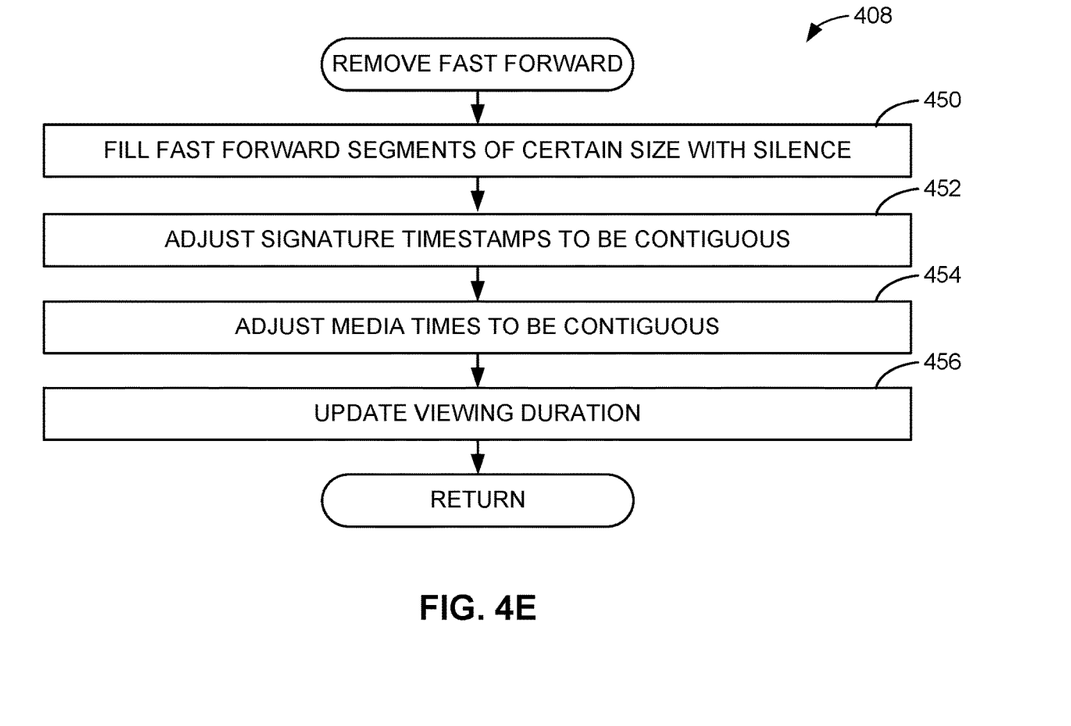

If the example event detector 302 of FIG. 3 detects a fast-forward, skip, etc. event (block 420), the example synthesizer 210 removes the fast-forward event (example program 408, see FIG. 4E). For example, the example event detector 302 can determine a fast-forward, skip, etc. event occurred by detecting use of a fast-forward, skip, etc. control aspect. The example program 408 of FIG. 4E begins with the example stream editor 304 filling all fast-forward sections of, for example, less than 33 seconds with silence starting at the media time when the fast-forward, skip, etc. started (block 450). In some examples, the period of time can be filled is configurable. In some examples, other types of fill are used, base media signatures are left missing, etc. The example timestamp editor 306 of FIG. 3 changes the timestamps of the constituent media signatures 114 in the set of reference media signature(s) 212 so the timestamps assigned to the constituent media signatures 114 are contiguous from before, through and after the pause event (block 452). The example media time editor 308 of FIG. 3 adjusts media times, if needed, so media times are also contiguous and consistent with the timestamps (block 454). In some examples, viewing duration is updated to include the pause event (block 456). Control returns from the example program 408 of FIG. 4E to block 414 of FIG. 4B.

Figure 4F:
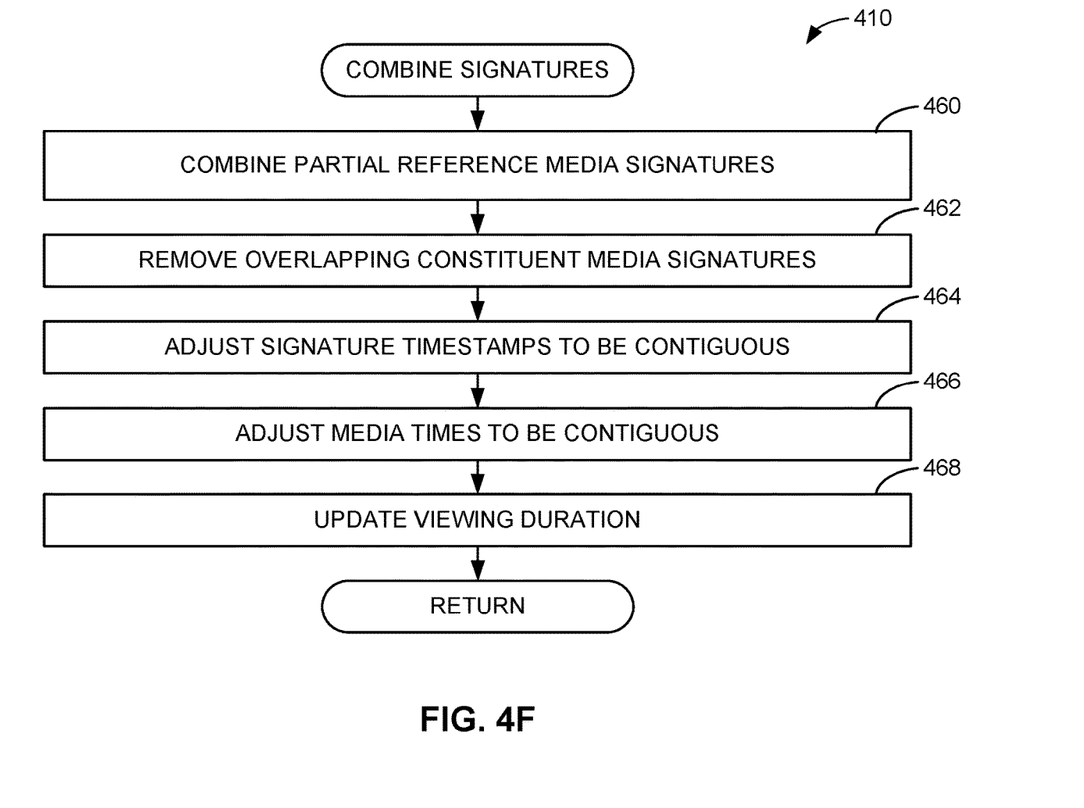

If only a partial set of reference media signature(s) 212 can be formed from the constituent media signatures 114 of a particular meter 110 (block 422 of FIG. 4B), the example stream editor 310 of FIG. 3 combines the partial set of reference media signature(s) 212 generated using constituent media signatures 114 from two or more meters 110 (example program 410, see FIG. 4F). The example program 410 of FIG. 4F begins with the example stream editor 310 of FIG. 3 using the media times associated with the constituent media signatures 114 of two or more meters 110 to combine (e.g., order, interlace, etc.) the constituent media signatures 114 together to form a combined reference media signature sequence 212 (block 460), and any overlapping signatures are removed (block 462). The example timestamp editor 306 of FIG. 3 changes the timestamps of the constituent media signatures 114 in the reference media signature 212 sequence so the timestamps assigned to the constituent media signatures 114 are contiguous from before, through and after the pause event (block 464). The media time editor 308 of FIG. 3 adjusts media times, if needed, so media times are also contiguous and consistent with the timestamps (block 466). In some examples, viewing duration is updated to include the pause event (block 468).

In some examples, the example synthesizer 210 determines a credit skip point (CSP) for use in recording where a view skips to a next episode. In some examples, the synthesizer 210 averages the CSP point (e.g., point when a user can skip to next episode) of multiple viewers to determine what media time corresponds to the CSP point.

Figure 5:
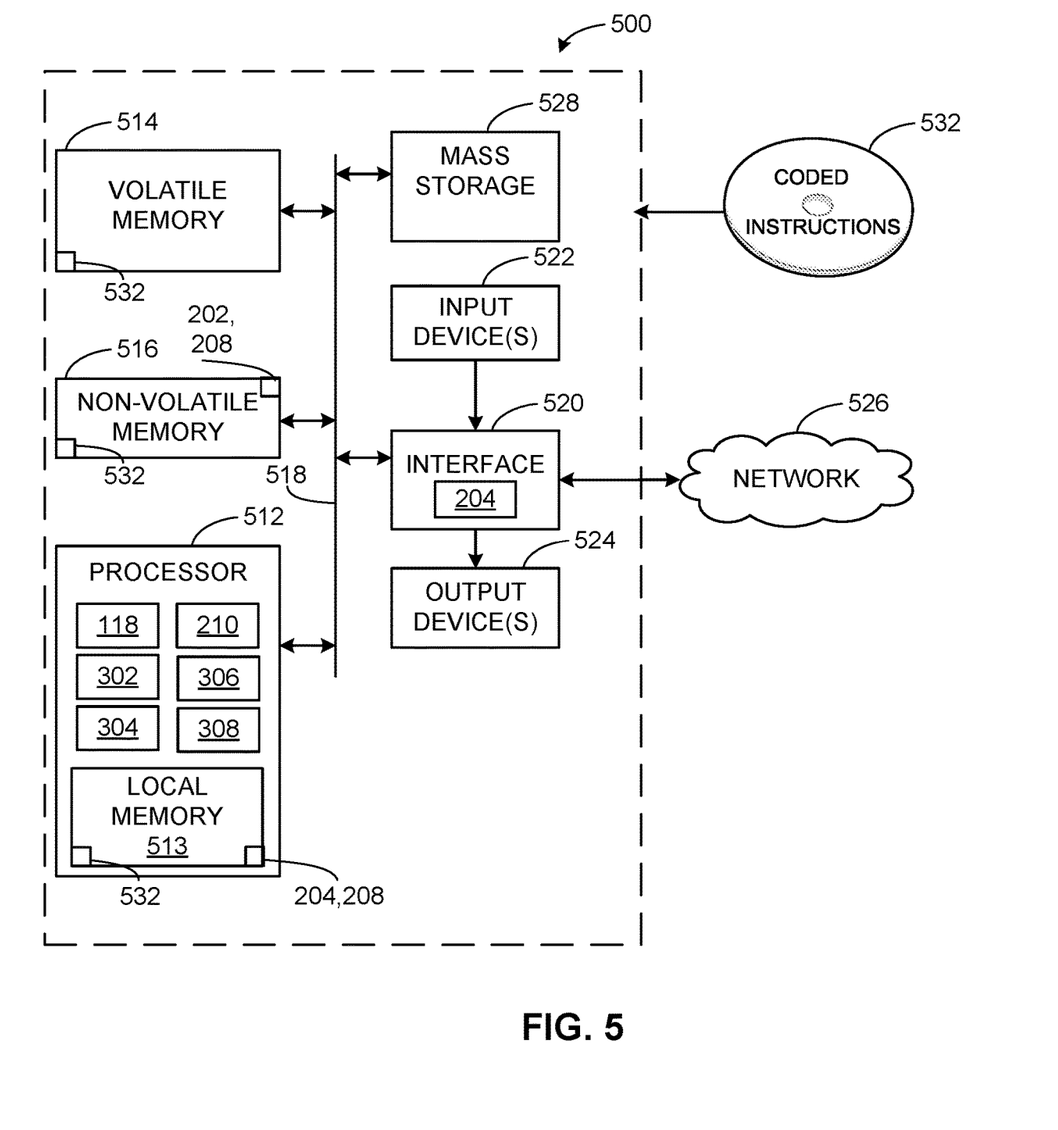
FIG. 5 illustrates an example processor platform structured to execute the example machine-readable instructions of FIGS. 4A-4F to implement the example synthesizer of FIGS. 2 and/or 3.

FIG. 5 is a block diagram of an example processor platform 500 structured to execute the instructions of FIGS. 4A-4F to implement the synthesizer 210 of FIG. 3. The processor platform 500 can be, for example, a server, a personal computer, a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, or any other type of computing device.

The processor platform 500 of the illustrated example includes a processor 510. The processor 510 of the illustrated example is hardware. For example, the processor 510 can be implemented by one or more integrated circuits, logic circuits, microprocessors, GPUs, DSPs or controllers from any desired family or manufacturer. The hardware processor may be a semiconductor based (e.g., silicon based) device. In this example, the processor implements the example event detector 302, the example stream editor 304, the example timestamp editor 306, the example media time editor 308, the example synthesizer 210 and/or the MDAM 118.

The processor 510 of the illustrated example includes a local memory 512 (e.g., a cache). The processor 510 of the illustrated example is in communication with a main memory including a volatile memory 514 and a non-volatile memory 516 via a bus 518. The volatile memory 514 may be implemented by Synchronous Dynamic Random-access Memory (SDRAM), Dynamic Random-access Memory (DRAM), RAMBUS® Dynamic Random-access Memory (RDRAM®) and/or any other type of random-access memory device. The non-volatile memory 516 may be implemented by flash memory and/or any other desired type of memory device. Access to the main memory 514, 516 is controlled by a memory controller. In this example, the non-volatile memory 516 implements the example constituent media signatures datastore 202, and the example reference media signatures datastores 208

The processor platform 500 of the illustrated example also includes an interface circuit 520. The interface circuit 520 may be implemented by any type of interface standard, such as an Ethernet interface, a universal serial bus (USB) interface, a Bluetooth®, a near field communication (NFC) interface, and/or a peripheral component interface (PCI) express interface.

In the illustrated example, one or more input devices 522 are connected to the interface circuit 520. The input device(s) 522 permit(s) a user to enter data and/or commands into the processor 510. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, etc.) a tactile output device, a printer, and/or speakers. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, a coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, CD drives, Blu-ray disk drives, redundant array of independent disks (RAID) systems, and DVD drives.

Coded instructions 532 including the coded instructions of FIGS. 4A-4F may be stored in the mass storage device 528, in the volatile memory 514, in the non-volatile memory 516, and/or on a removable tangible machine-readable storage medium such as a CD or DVD.

Any references, including publications, patent applications, and patents, cited herein are hereby incorporated by reference to the same extent as if each reference were individually and specifically indicated to be incorporated by reference and were set forth in its entirety herein.

Further still example methods, apparatus, systems and articles of manufacture (e.g., physical storage media) to synthesize reference media signatures, determine media content based on metadata and media signatures, and implement the example meter 100 are provided in U.S. patent application Ser. No. 15/679,862, entitled "Methods and Apparatus to Generate Reference Signatures From Streaming Media," and filed on Aug. 17, 2017, the entirety of which is incorporated herein by reference.

From the foregoing, it will be appreciated that example methods, apparatus and articles of manufacture have been disclosed to synthesize reference media signatures based on constituent media signatures generated by metered media devices. Using teachings of this disclosure, reference media signatures can be generated without having to be aware of the media before it is presented. From the foregoing, it will be appreciated that methods, apparatus and articles of manufacture have been disclosed which enhance the operations of a computer by decreasing the time it takes to begin metering new media, and to enable the metering new media even if the new media is not watermarked before being presented. In some examples, computer operations can meter more media using teachings of this disclosure. Furthermore, example methods, apparatus, and/or articles of manufacture disclosed herein identify and overcome inability in the prior art to meter media before they are watermarked.

Example methods, apparatus, and articles of manufacture to synthesize reference media signatures based on constituent media signatures generated by metered media devices are disclosed herein. Further examples and combinations thereof include at least the following.

Example 1 is an apparatus that includes:
a collector to collect first constituent media signatures from a first media device that identify a first portion of media;
a collector to collect second constituent media signatures from a second media device that identify a second portion of the media; and
a synthesizer to combine the first constituent media signatures from the first media device and the second constituent media signatures from the second media device to form a reference media signature that represents the media, the reference media signature for comparison with third constituent media signatures collected from a third media device to detect consumption of the media at the third media device.

Example 2 is the apparatus of example 1, further including:
an event detector to detect an event corresponding to at least one of a pause event, a stop event, a skip event, a fast-forward event, or a rewind event; and
a stream editor to discard a portion of the first constituent media signatures corresponding to detected event.

Example 3 is the apparatus of example 2, further including a timestamp editor to modify timestamps of the first constituent media signatures to compensate for discarding the portion of the first constituent media signatures.

Example 4 is the apparatus of example 2 or 3, further including a media time editor to modify media times in the media associated with the first constituent media signatures to compensate for discarding the portion of the first constituent media signatures.

Example 5 is the apparatus of any of examples 1 to 4, further including:
a stream editor to delete a first constituent media signature when the first constituent media signature matches a second constituent media signature; and
a timestamp editor to modify a timestamp of the second constituent media signature to be contiguous with a timestamp of a third constituent media signature preceding the first constituent media signature.

Example 6 is the apparatus of any of examples 1 to 5, wherein the first media device comprises the second media device.

Example 7 is a method that includes: obtaining first constituent media signatures from a first media device that identify a first portion of media;
obtaining second constituent media signatures from a second media device that identify a second portion of the media; and
combining, by executing an instruction with a processor, the first constituent media signatures from the first media device and the second constituent media signatures from the second media device to form a reference media signature that identifies the media.

Example 8 is the method of example 7, further including discarding a portion of the first constituent media signatures from the reference media signature.

Example 9 is the method of example 7 or 8, further including:
collecting a third media signature from a third media device;

comparing the third media signature with the reference media signature to identify presentation of the media at the third media device.

Example 10 is the method of any of examples 7 to 9, further including:

deleting a first constituent media signature when the first constituent media signature matches a second constituent media signature; and modifying a timestamp of the second constituent media signature to be contiguous with a timestamp of a third constituent media signature preceding the first constituent media signature.

Example 11 is the method of any of examples 7 to 10, further including discarding a first portion of the first constituent media signatures corresponding to at least one of a pause event, a stop event, a skip event, a fast-forward event, or a rewind event.

Example 12 is the method of example 11, further including modifying timestamps of a second portion of the first constituent media signatures to compensate for discarding the first portion of the first constituent media signatures.

Example 13 is the method of example 11 or 12, further including modifying media times in the media associated with the first constituent media signatures to compensate for discarding the portion of the first constituent media signatures.

Example 14 is the method of any of examples 7 to 13, wherein the first media device comprises the second media device.

Example 15 is a non-transitory computer-readable storage medium comprising instructions that, when executed, cause a machine to at least:

obtain first constituent media signatures from a first media device that identify a first portion of media;

obtain second constituent media signatures from a second media device that identify a second portion of the media; and combine the first constituent media signatures from the first media device and the second constituent media signatures from the second media device to form a reference media signature that represents the media, the reference media signature for comparison with third constituent media signatures obtained from a third media device to detect consumption of the media at the third media device.

Example 16 is the non-transitory computer-readable storage medium of example 15, including instructions that, when executed, cause the machine to discard a portion of the first constituent media signatures from the reference media signature.

Example 17 is the non-transitory computer-readable storage medium of example 15 or 18, including instructions that, when executed, cause the machine to discard a portion of the first constituent media signatures corresponding to at least one of a pause event, a stop event, a skip event, a fast-forward event, or a rewind event.

Example 18 is the non-transitory computer-readable storage medium of example 17, including instructions that, when executed, cause the machine to modify timestamps of the first constituent media signatures to compensate for discarding the portion of the first constituent media signatures.

Example 19 is the non-transitory computer-readable storage medium of example 17 or 18, including instructions that, when executed, cause the machine to discard modify media times in the media associated with the first constituent media signatures to compensate for discarding the portion of the first constituent media signatures.

Example 20 is the non-transitory computer-readable storage medium of any of examples 15 to 19, including instructions that, when executed, cause the machine to:

delete a first constituent media signature when the first constituent media signature matches a second constituent media signature; and modify a timestamp of the second constituent media signature to be contiguous with a timestamp of a third constituent media signature preceding the first constituent media signature.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to synthesize reference signatures, the apparatus comprising:

memory including computer readable instructions; and a processor to execute the instructions to at least:

access a first sequence of media signatures collected from a first device, the first sequence of media signatures representative of a first portion of first media, respective ones of the first sequence of media signatures having corresponding first timestamps;

discard a subset of the first sequence of media signatures associated with an event identified in metadata associated with the first sequence of media signatures;

change the first timestamps of remaining ones of the first sequence of media signatures to determine a modified first sequence of media signatures; and combine the modified first sequence of media signatures with a second sequence of media signatures collected from a second device different from the first device to form a sequence of reference signatures that represent the first media.

2. The apparatus of claim 1, wherein the metadata is associated with operation of a media player that presented the first media, and the event corresponds to at least one of a pause event, a stop event or a rewind event.

3. The apparatus of claim 2, wherein respective ones of the modified first sequence of media signatures have corresponding modified first timestamps, and the processor is to change the first timestamps of the remaining ones of the first sequence of media signatures to cause the modified first timestamps to be contiguous after the subset of the first sequence of media signatures is discarded.

4. The apparatus of claim 2, wherein the media player is implemented by the first device.

5. The apparatus of claim 2, wherein the media player is implemented by a media device monitored by the first device.

6. The apparatus of claim 1, wherein the processor is further to implement a web server to collect the first sequence of media signatures from the first device and the second sequence of media signatures from the second device.

7. The apparatus of claim 1, wherein the processor is further to compare the sequence of reference signatures with a third sequence of media signatures collected from a third device to determine whether the third sequence of media signatures is representative of the first media.

8. A non-transitory computer-readable medium comprising computer-readable instructions that, when executed, cause a processor to at least:
- access a first sequence of media signatures collected from a first device, the first sequence of media signatures representative of a first portion of first media, respective ones of the first sequence of media signatures having corresponding first timestamps;
- discard a subset of the first sequence of media signatures associated with an event identified in metadata associated with the first sequence of media signatures;
- change the first timestamps of remaining ones of the first sequence of media signatures to determine a modified first sequence of media signatures; and
- combine the modified first sequence of media signatures with a second sequence of media signatures collected from a second device different from the first device to form a sequence of reference signatures that represent the first media.

9. The non-transitory computer-readable medium of claim 8, wherein the metadata is associated with operation of a media player that presented the first media, and the event corresponds to at least one of a pause event, a stop event or a rewind event.

10. The non-transitory computer-readable medium of claim 9, wherein respective ones of the modified first sequence of media signatures have corresponding modified first timestamps, and the instructions, when executed, cause the processor to change the first timestamps of the remaining ones of the first sequence of media signatures to cause the modified first timestamps to be contiguous after the subset of the first sequence of media signatures is discarded.

11. The non-transitory computer-readable medium of claim 9, wherein the media player is implemented by the first device.

12. The non-transitory computer-readable medium of claim 9, wherein the media player is implemented by a media device monitored by the first device.

13. The non-transitory computer-readable medium of claim 8, wherein the instructions, when executed, further cause the processor to implement a web server to collect the first sequence of media signatures from the first device and the second sequence of media signatures from the second device.

14. The non-transitory computer-readable medium of claim 8, wherein the instructions, when executed, further cause the processor to compare the sequence of reference signatures with a third sequence of media signatures collected from a third device to determine whether the third sequence of media signatures is representative of the first media.

15. A method to synthesize reference signatures, the method comprising:
- accessing a first sequence of media signatures collected from a first device, the first sequence of media signatures representative of a first portion of first media, respective ones of the first sequence of media signatures having corresponding first timestamps;
- discarding, by executing an instruction with a processor, a subset of the first sequence of media signatures associated with an event identified in metadata associated with the first sequence of media signatures;
- changing, by executing an instruction with the processor, the first timestamps of remaining ones of the first sequence of media signatures to determine a modified first sequence of media signatures; and
- combining, by executing an instruction with the processor, the modified first sequence of media signatures with a second sequence of media signatures collected from a second device different from the first device to form a sequence of reference signatures that represent the first media.

16. The method of claim 15, wherein the metadata is associated with operation of a media player that presented the first media, and the event corresponds to at least one of a pause event, a stop event or a rewind event.

17. The method of claim 16, wherein respective ones of the modified first sequence of media signatures have corresponding modified first timestamps, and the changing of the first timestamps includes changing the first timestamps of the remaining ones of the first sequence of media signatures to cause the modified first timestamps to be contiguous after the subset of the first sequence of media signatures is discarded.

18. The method of claim 16, wherein the media player is at least one of implemented by the first device or implemented by a media device monitored by the first device.

19. The method of claim 15, further including implementing a web server to collect the first sequence of media signatures from the first device and the second sequence of media signatures from the second device.

20. The method of claim 15, further including comparing the sequence of reference signatures with a third sequence of media signatures collected from a third device to determine whether the third sequence of media signatures is representative of the first media.

* * * * *